United States Patent [19]

Ishikawa

[11] Patent Number: 4,667,244
[45] Date of Patent: May 19, 1987

[54] PAPER FEEDING APPARATUS

[75] Inventor: Masaaki Ishikawa, Hino, Japan

[73] Assignee: Kabushiki Kaisha Toshiba, Japan

[21] Appl. No.: 675,834

[22] Filed: Nov. 28, 1984

[30] Foreign Application Priority Data

Nov. 29, 1983 [JP] Japan .................. 58-225053

[51] Int. Cl.⁴ .............................................. B65H 5/06
[52] U.S. Cl. ...................... 358/294; 271/10;
271/35; 271/116; 271/121; 271/161; 271/167;
271/270
[58] Field of Search .................. 271/4, 10, 116, 114,
271/121, 167, 272, 273, 274, 275, 35, 161, 270;
250/571; 358/285, 293, 294

[56] References Cited

U.S. PATENT DOCUMENTS

| | | | |
|---|---|---|---|
| 3,575,410 | 4/1971 | Suzuki | 271/114 |
| 3,838,851 | 10/1974 | Kolibas | 271/116 |
| 3,944,209 | 3/1976 | Fallos | 271/167 |
| 3,986,712 | 10/1976 | Hasegawa | 271/167 |
| 4,409,624 | 10/1983 | Kingsley | 355/8 |
| 4,457,507 | 7/1984 | Ishikawa et al. | 271/121 |
| 4,474,365 | 10/1984 | Di Blasio | 271/116 |

FOREIGN PATENT DOCUMENTS 100443 12/1981 Japan .
0009648 1/1982 Japan ....................... 271/121

Primary Examiner—Richard A. Schacher
Attorney, Agent, or Firm—Finnegan, Henderson, Farabow, Garrett & Dunner

[57] ABSTRACT

A paper feeding apparatus includes a combination of feeding roller and paper separating member for feeding a plurality of papers on the paper holding board one by one and a combination of transferring roller and thrusting member for receiving paper from the combination of feeding roller and paper separating member and transferring it further. To separate the foregoing paper away from the subsequent one the peripheral speed of the transferring roller is determined higher than that of the paper feeding roller. Both the paper feeding roller and the transferring roller are arranged on a single shaft and thereby the apparatus is constructed in smaller dimensions.

15 Claims, 7 Drawing Figures

PAPER FEEDING APPARATUS

BACKGROUND OF THE INVENTION

1. Field of the Invention

The present invention relates to a paper feeding apparatus and more particularly to a paper feeding apparatus preferably used for an image information reading apparatus in facsimile or the like machine.

2. Description of the Prior Art

A conventional image information reading apparatus incorporated in facsimile or the like machine is generally constructed such that image information on an original is read using image information reading means which is held immovably, while the original is transferred by a paper transferring device at a subscanning speed. A plurality of originals on the original holding board are fed one by one, as adjacent originals are transferred while keeping a certain gap therebetween.

A paper transferring device usable for the conventional image information reading apparatus incorporated in facsimile or the like machine is schematically illustrated in FIG. 1.

A conventional image information reading apparatus comprises a paper feeding roller 2 located in the proximity of the lower end of the inclined original holding board 1, a platen roller 3 and a pair of discharging rollers 4 disposed below the paper feeding roller 2 at a predetermined distance as measured from the latter. Further, a pad 5 is brought in pressure contact with the outer surface of the paper feeding roller 2 and a platen glass 6 is disposed opposite to the platen roller 3 while coming in contact with the latter. The conventional image information reading apparatus as constructed in the above-described manner is operated by way of the steps of taking one original 7a from a stacked layer of originals on the original holding board 1 through cooperation between the paper feeding roller 2 and the pad 5, feeding it to the area defined between the platen roller 3 and the platen glass 6, and reading image information on the original 7a through the platen glass 6 with the aid of a sensor 8 while transferring it toward the discharging rollers 4 by rotating the platen roller 3. Further, in the image information reading apparatus a fluorescent lamp 9 is disposed in the area between the paper feeding roller 2 and the platen roller 3 on the lefthand side of the original transferring passage as seen in FIG. 1 sensor 10 such as a light beam receiving element or the like is disposed at the position located opposite to the fluorescent lamp 9 relative to the original transferring passage whereby both the fore and rear ends of the original 7a are detected.

In the conventional image information reading apparatus the original 7a is required to have the same moving speed as sub-scanning speed while it is transferred by means of the platen roller 3. On the other hand, to form a gap between the previous original 7a and the next original 7b, the moving speed of the subsequent original 7b should be lower than that of the previous original 7a taking into consideration breakage of roll paper and other malfunctions, which is reflected by variations in the gap as detected by sensor 10.

To meet the above-described requirements an arrangement is made for the image information reading apparatus so as to rotate the paper feeding roller 2 and the platen roller 3 with the aid of separate driving mechanisms in such a manner that the paper feeding roller 2 has a peripheral speed lower than that of the platen roller 3. Alternatively, the paper feeding roller 2 is operatively connected to power supply via clutching means so that after the previous original 7a is taken by the platen roller 3, feeding of the subsequent original 7b is interrupted by turning off the clutching means and allowing the paper feeding roller 2 to rotate idly.

Accordingly, it has been found with respect to the conventional image information reading apparatus that designing of the apparatus in smaller dimensions can be achieved only within a limited extent. Further, the apparatus is complicated in structure and is manufactured at an expensive cost.

SUMMARY OF THE INVENTION

Thus, the present invention has been made with the above-mentioned background in mind. Specifically, prior to transferring a plurality of papers on the paper holding board the papers are separated one by one and the foregoing paper is parted away from the next subsequent one during their transfer. According to the invention the paper feeding roller and the transferring roller are arranged coaxially on a single shaft in order that they are driven separately. The thrusting member and the paper separating member are arranged such that the position where the thrusting member comes in pressure contact with the transferring roller is offset downwardly of the position where the paper separating member comes in presence contact with the paper feeding roller. Further, the paper feeding roller and the transferring roller are provided with driving means respectively which is adapted to operate individually. Thus, the apparatus can be constructed in smaller dimensions.

OBJECTS OF THE INVENTION

It is an object of the present invention to provide a paper feeding apparatus which makes it possible to construct it in smaller dimensions.

It is other object of the present invention to provide a paper feeding apparatus which is simple in structure.

Other objects and advantageous features of the invention will become more clearly apparent from reading of the following description.

BRIEF DESCRIPTION OF THE DRAWINGS

The accompanying drawings will be briefly described below.

DESCRIPTION OF THE PREFERRED EMBODIMENTS

Now, the present invention will be described in a greater detail with reference to FIGS. 2 to 5 which schematically illustrate preferred embodiments thereof.

Figure 1:
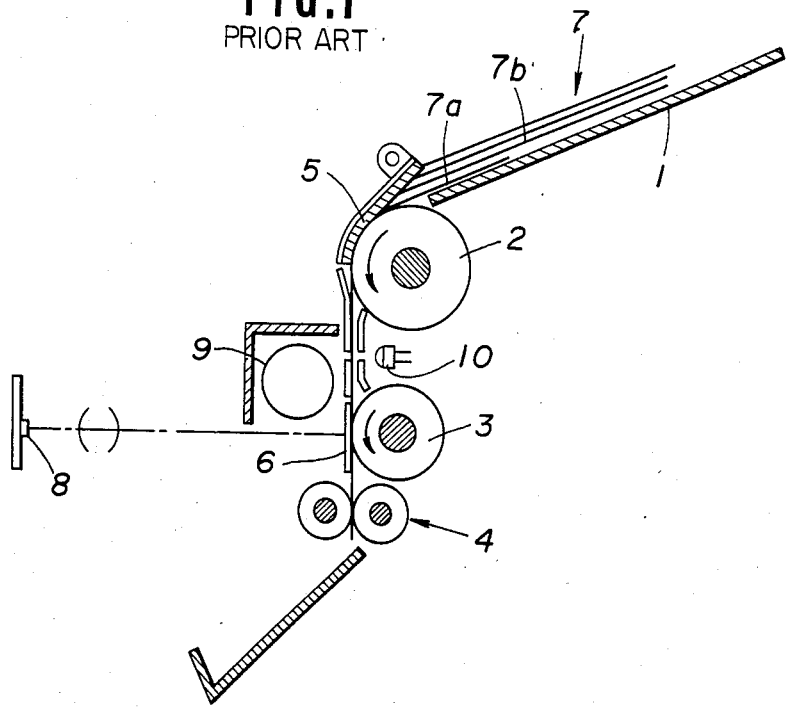
FIG. 1 is a schematic vertical sectional view of image information reading apparatus with a conventional paper feeding apparatus mounted thereon.
Figure 2:
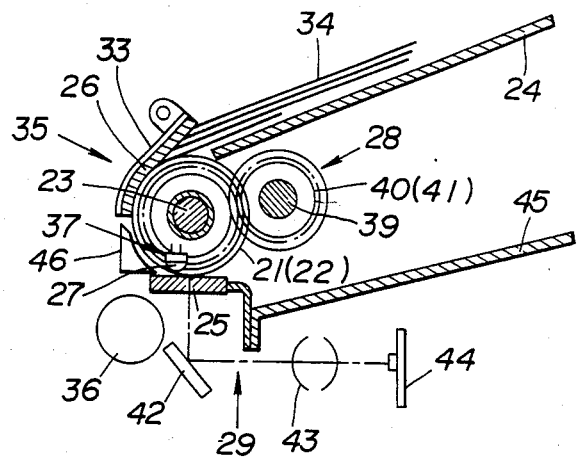
FIG. 2 is a schematic vertical sectional view of image information reading apparatus with a paper feeding apparatus of the invention mounted thereon.
Figure 3:
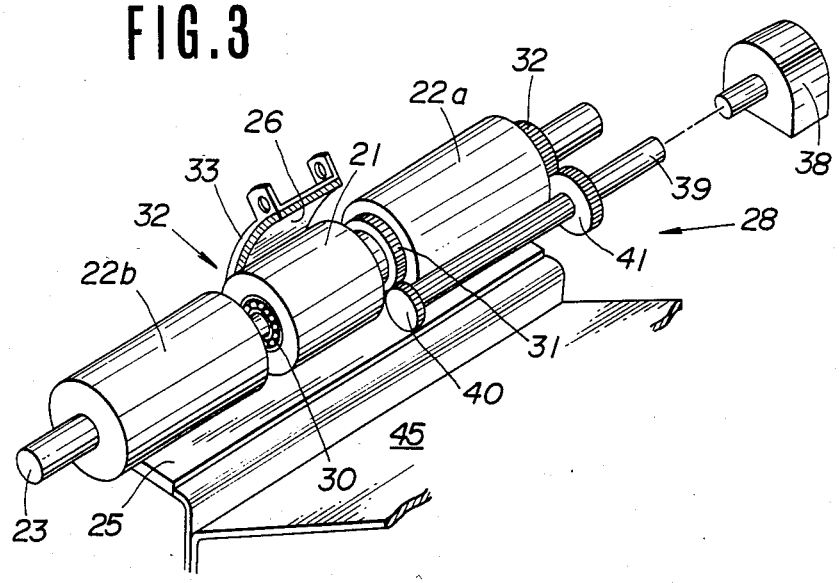
FIG. 3 is a perspective view illustrating an essential part of the paper feeding apparatus of the invention.

As illustrated in FIGS. 2 and 3, an image information reading apparatus includes a paper feeding roller 21 and platen rollers (transference rollers) 22 which are arranged coaxially on a single shaft 23. An original holding board (paper holding board) 24 is disposed at the position located above the rollers 21 and 22, a platen glass (thrusting member) 25 is disposed below the rollers 21 and 22, a paper separating member 26 is disposed in the area as defined by the lower end of the original holding board 24 and a part of the periphery of the paper feeding roller 21. A sensor 27 is disposed in the area extending between the paper separating member 26 and the platen glass 25. Further, the image information reading apparatus is provided with driving means 28 at the position located rightwardly of both the paper feeding roller 21 and the platen rollers 22 as seen in the drawing where it does not participate in transference of the original papers. The image information reading means 29 is disposed on the rear side of the platen glass 25, that is, on the opposite side to the platen roller 21.

The shaft 23 is rotatably supported on the apparatus with the aid of a frame or similar means so that a single paper feeding roller 21 is rotatably mounted on the central part of the shaft 23 as seen in the longitudinal direction with a bearing 30 interposed therebetween. A pair of platen rollers 22a and 22b are fixedly mounted on the shaft 23 on both the sides of the paper feeding roller 21. A gear 31 is attached to the one end face of the paper feeding roller 21 and a gear 32 is attached to the one end face of the platen roller 22a.

The original holding board 24 is fixedly secured to the frame in the inclined state and its lower end is located in the proximity of the paper feeding roller 21 and the platen roller 22a. On the other hand, the platen glass 25 is disposed at the position contacting the platen rollers 22 and the paper feeding roller 21.

The paper separating member 26 is mounted on the frame or the like means of the apparatus with the aid of a holder 33 at the position where it comes in contact with the paper feeding roller 21 or it is located in the proximity of the same. Thus, a double feeding prevention means 35 for originals 34 includes a combination of the paper separating member 26 and the paper feeding roller 21. This double feeding prevention means 35 is intended to inhibit an occurrence of double feeding of originals 34 by utilizing different coefficients of friction for various elements, namely friction coefficient $\mu_1$ existing between paper feeding roller 21 and original 34, friction coefficient $\mu_2$ between paper separating member 26 and original 34, and friction coefficient $\mu_3$ between both originals 34. It is an important thing that material of the paper feeding roller 21 and the paper separating member 26 is so selected that an inequality $\mu_1 > \mu_2 > \mu_3$ is established among them.

The sensor 27 serves to detect the existence of gap between two adjacent originals 34 and is disposed at the original entrance end of the platen glass. Thus, original end detecting means 37 is constituted by a combination of the sensor 27 and the fluorescent lamp 36 adapted to be used in the image information reading means 29 for lighting original. Specifically, the original end detecting means 37 is located at the position opposite to the fluorescent lamp 36 relative to the platen glass 25 and serves to detect the fore end of an original 34 when light beam coming up from the fluorescent lamp 36 is interrupted by means of the original 34 which has passed on the platen glass 25 and later detect the rear end of the same when arrival of light beam from the fluorescent lamp 36 is detected again by the sensor 27 after the whole original 34 moves away therefrom.

The driving means 28 includes a driving shaft 39 of which one end is operatively connected to a motor 38. The driving shaft 39 extends in parallel with the shaft 23 of the platen roller 22 and carries gears 40 and 41 at the other end thereof, the one 40 of them meshing with the gear 31 on the paper feeding roller 21 and the other one 41 meshing with the gear 32 on the platen roller 22a. An arrangement is made for the driving means 28 such that the peripheral speed of the platen rollers 22a and 22b is determined appreciably higher than that of the paper feeding roller 21 by properly selecting ratio of number of teeth of the gear 31 to that of the gear 40 as well as ratio of number of teeth of the gear 32 to that of the gear 41.

The image information reading means 29 comprises a fluorescent lamp 36, a mirror 42, a lens 43 and an image sensor 44, allowing the image information on the original 34 lighted by the fluorescent lamp 36 to be transmitted to the mirror 42 via the platen glass 25 and it is then build on the sensor 44 past the lens 43 where it is converted into electrical signal.

In FIGS. 2 and 3, reference numeral 45 designates a tray on which the original is placed after completion of reading of image information and reference numeral 46 is an original guide extending between the paper separating member 26 and the platen glass 25.

Next, operation of the image information reading apparatus as constructed in the above-described manner will be described below.

As the motor 38 is driven, its rotational force is transmitted to the driving shaft 39 to rotate the latter. The paper feeding roller 21 is then rotated via the gears 40 and 31 and the platen roller 22a is rotated via the gears 41 and 32. At the same time the platen roller 22b is rotated also via the shaft 23. As the paper feeding roller 21 and the platen rollers 22a and 22b are rotated in that way, the fore end of an original 34 on the original holding board 24 is introduced into the space as defined between the paper feeding roller 21 and the paper separating member 26. Thus, the original 34 located at the lowermost end of the stacked layer of originals is selectively transferred to the platen glass 25. It should be noted that since the original 34 is brought in pressure contact with the paper feeding roller 21 under the effect of dead weight of the paper separating member 26 during paper feeding operation, frictional force existent between the original 34 and the paper feeding roller 21 becomes larger than frictional force between the original 34 and the platen rollers 22a and 22b whereby the original 34 is transferred by transferring force of which intensity is substantially determined by the paper feeding roller 21.

As the original 34 is displaced in that way, its fore end is introduced into the space between the platen glass 25 and the paper feeding roller 21 as well as between the platen glass 25 and the platen rollers 22a and 22b. Thus, the original 34 is transferred toward the tray 45 by means of the paper feeding roller 21 and the platen rollers 22a and 22b or merely by means of the platen rollers 22a and 22b while it is brought in pressure contact with the platen glass 25. Incidentally, at this point the original 34 is transferred mainly by frictional force existent between the original 34 and the platen rollers 22a and 22b at a speed (sub-scanning speed) which is determined by the platen rollers 22a and 22b. Image information on the original 34 which is moving on the platen glass 25 is read by means of the image sensor 44 through the platen glass 25, the mirror 42 and the lens 43.

After completion of reading of image information, the original 34 is discharged on the tray 45.

In the image information reading apparatus of the invention continuous paper feeding can be achieved for a plurality of originals 34 by means of the paper feeding roller 21. Since the original 34 which has moved in advance is transferred at a higher speed which is determined by the peripheral speed of the platen rollers after its fore end is introduced into the space as defined between the platen rollers 21a and 21b and the platen glass 25, its rear end is increasingly parted away from the fore end of the subsequent original 34. As a result, the distance, measured between the rear end of the foregoing original 34 and the fore end of the subsequent original 34 when the rear end of the foregoing original 34 reaches the sensor 27, increases sufficiently.

One of the most important things to be noted here with respect to the present invention is that the rear end of the foregoing original 34 is parted away from the fore end of the subsequent original 34 at least before it reaches the sensor 27. To achieve this operating condition, it is necessary for the peripheral speed of the platen rollers 22a and 22b to be higher than that of the paper feeding roller 21, wherein transfer of the previous original 34 at a speed which is dependent on the platen rollers 22a and 22b and transfer the subsequent original 34 at a speed which is dependent on the paper feeding roller 21. In one embodiment, in which the platen rollers 22a and 22b has a diameter of 30 mm, the paper feeding roller has a diameter of 29.5 mm, the platen rollers 22a and 22b are brought in pressure contact with the platen glass 25 with higher contact pressure than the paper feeding roller 21 with the latter. Further the position of detection of the sensor 27 is to be at a distance of about 25 mm as measured from the position where the paper separating member 26 came in contact with the paper feeding roller 21. To insure that the rear end of the foregoing original was parted away from the fore end of the subsequent original at a distance of about 3 mm before the rear end of the foregoing original reached the sensor 27, the ratio of number of teeth of the driving gear 41 to that of the driven gear 32 was determined to be 1 and the ratio of number of teeth of the driving gear 40 to that of the driven gear 31 was determined to be 0.88.

Figure 4:
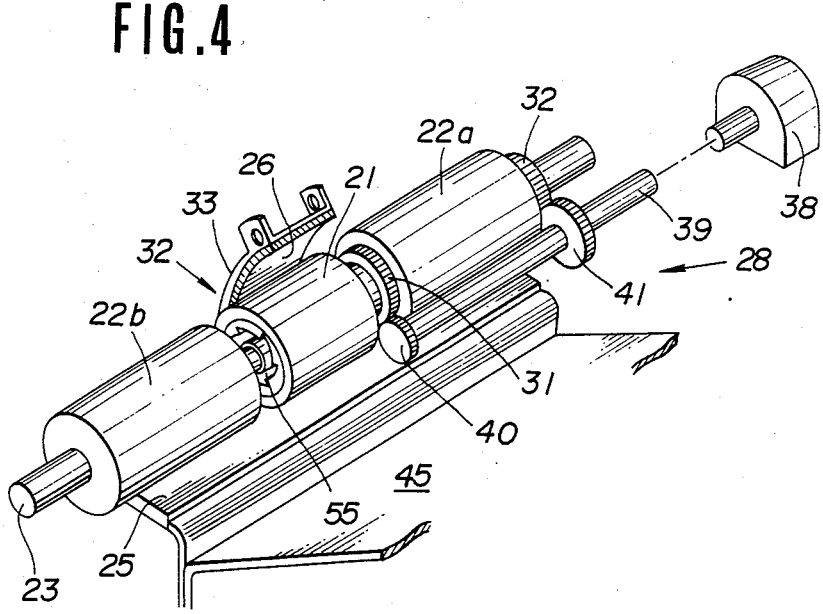
FIG. 4 is a perspective view illustrating another example of driving means in the paper feeding apparatus of the invention.

Further, in the above embodiment, a one-way clutch 55 may be provided between the paper feeding roller 21 and the shaft 23 (refer to FIG. 4). In this case, the rotational speed of the paper feeding roller 21 and that of the platen rollers 22a and 22b become same after the original 34 is drawn between the platen rollers. As a result, the unfavorable force applied to the original 34 by the paper feeding roller 21 and the paper separating member 26 becomes small as compared with the above embodiment in which no such one-way clutch is provided. Thus, the transferring efficiency by the platen rollers 22a and 22b is improved. The one-way clutch 55 may also be provided at the gear 40 in place of the paper feeding roller 21.

Figure 5:
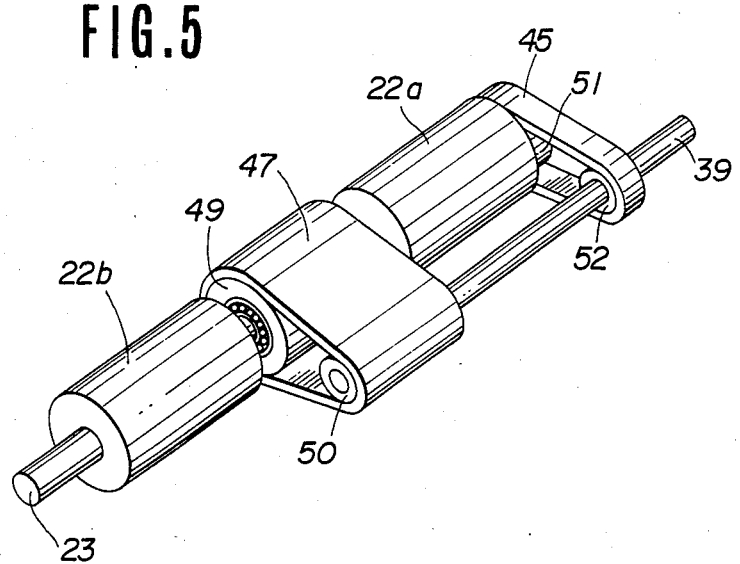
FIG. 5 is a perspective view illustrating further example of driving means in the paper feeding apparatus of the invention.

To drive the paper feeding roller 21 and the platen rollers 22a and 22b belts 47 and 48 as illustrated in FIG. 5 may be employed. In this type of driving mechanism a pulley 49 having the substantially same width as that of the paper feeding roller is arranged at the position to be assumed by the paper feeding roller and the belt 47 is extended around both the pulley 49 and the pulley 50 fixedly mounted on the driving shaft 39 so that an original transferring surface is constituted by the surface of the belt 47. On the other hand, a pulley 51 is attached to the one end face of the platen roller 22a and the belt 48 is extended around both the pulley 51 and the pulley 52 fixedly mounted on the driving shaft 39.

This driving mechanism is almost same to the above-described one with the exception that the belt 47 is driven by means of the pulleys 50 and 49 and the platen rollers 22a and 22b are rotated by a combination of the pulley 52, the belt 48 and the pulley 51.

Figure 6:
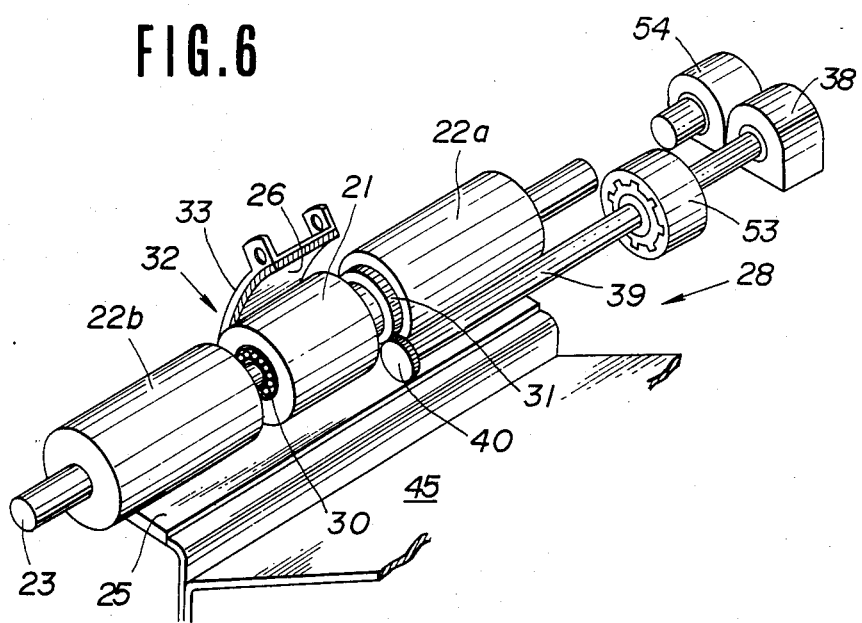
FIG. 6 is a perspective view illustrating a still further example of driving means in the paper feeding apparatus of the invention.

Alternatively, an electromagnetic clutch 53 as shown in FIG. 6 may be employed for the driving mechanism. In this case a motor 54 is connected directly to the shaft 23 to rotate the latter and the paper feeding roller 21 is operatively associated with the driving shaft 39 via gears 40 and 31 in the same manner as illustrated in FIG. 3 while the driving shaft 39 is connected to the motor 38 via the electromagnetic clutch 53. In this type of driving mechanism an arrangement is made such that when the foregoing original reaches the space as defined between the platen glass 25 and the platen rollers 22a and 22b and it is then taken by the latter, the electromagnetic clutch 53 is actuated so as to interrupt connection between the driving shaft 39 and the motor 38 and thereby stop transference of the subsequence original whereby a gap is created between the adjacent originals. The arrangement made in that way assures the same functional effect as in case where the peripheral speed of the platen rollers 22a and 22b is higher than that of the paper feeding roller 21, although the paper feeding roller 21 has the same peripheral speed as that of the platen rollers 22a and 22b.

Further, without any use of the above-described clutches 53 and moreover without such an arrangement that the paper feeding roller 21 is designed to have a different diameter from that of the platen rollers 22a and 22b, the same functional effect as described above, that may be, the foregoing original is kept separated from the subsequent one by properly selecting material of the rollers in such a manner as to establish an inequality $\mu_1 < \mu_4$, where $\mu_1$ is a friction coefficient existent between the paper feeding roller 21 and the original 34 and $\mu_4$ is a friction coefficient between the platen rollers 22a and 22b and the original 34. This is attributable to the fact that when the foregoing original 34 is transferred on the platen glass 25, it is transferred at a speed which is dependent on the platen rollers 22a and 22b, because transference force of the original given by the platen rollers 22a and 22b overcomes transference inhibitive force of the original given by the paper feeding roller 21, whereas when the subsequent original 34 is transferred in the area extending between the paper separating member 26 and the paper feeding roller 21, it is transferred by transference force of the paper feeding roller 21 which is obtainable by pressure contact force of the paper separating member 26.

In the image information reading apparatus according to the above-described embodiments image information on the original 34 is read through the transparent platen glass 25. However, it should of course be understood that the present invention may be applied to an image information reading apparatus in which an opaque platen plate or a pinch roller is employed instead of the transparent platen plate. In such case, the image reading apparatus is so designed that image information on an original is read by the image sensor immediately after it passed the opaque platen plate or the pinch roller.

Figure 7:
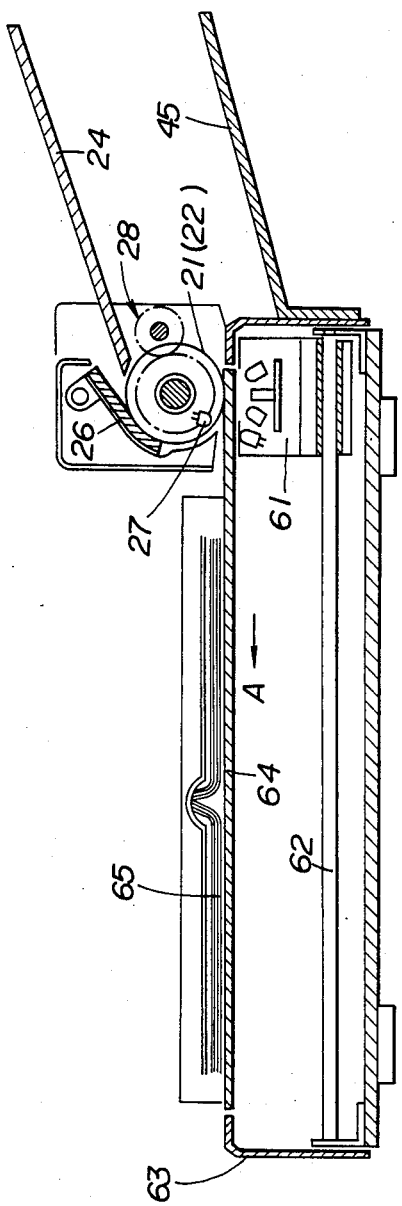
FIG. 7 is a schematic vertical sectional view of a facsimile posting machine of the type having an original held immovably, wherein the paper feeding apparatus of the invention is incorporated in the machine.

FIG. 7 schematically illustrates an example of facsimile posting machine of the type in which an original is held immovably, wherein an image information reading apparatus of the invention is incorporated in the machine. In the image information reading apparatus employed for the machine the image information reading means 29 as illustrated in FIG. 2 is replaced with a close contact type sensor unit 61 adapted to move along a rod 62 at a sub-scanning speed. In FIG. 7 reference numeral 63 designates a machine casing, reference numeral 64 is a platen glass which serves also as the aforesaid platen glass 25.

When image information on an original sheet is continuously transmitted by operating the facsimile posting machine, the original is first placed on the original holding board 24 and it is then transferred to the tray 45 by way of the steps as described above. During transference of the original image information on the latter is read by the close contact type sensor unit 61. When image information on a book 65 is to be transmitted, it is placed on the platen glass 64 and the close contact type sensor unit 61 is displaced along the rod 62 at a subscanning speed. Thus, image information on the book 65 can be read by means of the close contact type sensor unit 61.

The present invention has been described above with respect to embodiments where the paper feeding apparatus of the invention is applied to the image information reading apparatus. However, it should not be limited only to this but it may be applied to other apparatus which has necessity for feeding paper or the like material.

What is claimed is:

1. An image information reading apparatus comprising:

a paper holding board for supporting sheets of paper, said holding board including a leading edge and being canted downward in the direction of said leading edge;

paper feeding roller means located substantially adjacent said leading edge to contact the fore end of a lowermost sheet of paper in a stacked layer of papers supported on said paper holding board, said paper feeding roller means including a paper feeding roller;

paper separating means disposed at a first position for providing pressure contact with said paper feeding roller means to inhibit subsequent sheets of paper from being taken from the stacked layer of papers until said lowermost sheet of paper is removed from said stacked layer of papers, said paper separating means extending along a portion of the circumference of said paper feeding roller;

transferring roller means coaxially mounted relative to said paper feeding roller means and rotated independently of the paper feeding roller means, said transferring roller means includes transferring rollers, wherein said paper feeding roller means and said transferring roller means define a path of movement for said sheets, and wherein the diameter of said transferring rollers is greater than the diameter of said paper feeding roller;

thrusting means fixedly mounted and spaced from said paper separating means along said path of movement for providing pressure contact with the surface of said transferring roller means at a second position located downstream along said path of movement from said first position, said thrusting means being a plate section, wherein the pressure contact at said second position enables the rotation of the transferring roller means relative to said fixed plate section to continue transfer of said sheets along said path of movement; and driving means for driving said paper feeding roller means and said transferring roller means independently.

2. The image information reading apparatus as defined in claim 1, wherein said driving means includes a common shaft for coaxially mounting said paper feeding roller means and said transfer roller means, wherein said transferring roller means includes a pair of transferring rollers and wherein said paper feeding roller means includes a feeding roller mounted on said common shaft between said pair of transferring rollers.

3. The image information reading apparatus as defined claim 2, wherein said driving means includes first gear means and second gear means, said second gear means being mounted on said common shaft for meshing with said first gear means, and wherein the ratio of number of teeth of said first and second gear means is determined such that said transferring roller means has a peripheral speed higher than that of said paper feeding roller means.

4. The image information reading apparatus as defined in claim 2, wherein said driving means includes a first belt and a second belt, said first belt extending between said driving means and said paper feeding roller and said second belt extending between said driving means and at least one of said transferring rollers, and wherein said transferring rollers have a peripheral speed higher than that of the paper feeding roller.

5. The image information reading apparatus as defined in claim 2, wherein said paper feeding roller means and said transferring roller means includes first pulley means, and wherein said driving means includes a drive rod and second pulley means, said secind pulley means being mounted on said drive rod, said driving means also including belts extended around said first and second pulley means, the relative diameters of said first pulley means and said second pulley means being of such dimension that said transferring roller means has a peripheral speed higher than the speed of said paper feeding roller means, and wherein said paper feeding roller means normally contacts the fore end of the lowermost paper proximate said leading edge.

6. The image information reading apparatus as defined in claim 1 wherein said driving means includes power supply and an electromagnetic clutch, wherein said paper feeding roller means connected to said power supply through said electromagnetic clutch.

7. The image information reading apparatus as defined in claim 1 wherein said driving means includes a power supply and a one-way clutch wherein said paper feeding roller means is connected to said power supply through said one-way clutch.

8. An image information reading apparatus comprising:

a paper feeding section; and an image information reading section;
said paper feeding section including:
  a paper holding board supporting a stack of sheets of paper and having a leading edge, said paper holding board being canted toward said leading edge;
  a paper feeding roller disposed at a position located substantially adjacent said leading edge to contact an end of the lowermost one of said stack of sheets supported on said paper holding board;
  a paper separating member contacting said paper feeding roller at a first position to inhibit subsequent sheets of paper from being taken from said stack of sheets;
  a transferring roller means disposed coaxially relative to the paper feeding roller and rotatable independently of the paper feeding roller, wherein said paper feeding roller and said transferring roller define a path of movement for said sheets, and wherein the diameter of said transferring roller means is larger than the diameter of said paper feeding roller;
  a fixed thrusting plate contacting said rotatable transferring roller means at a second position located downstream from said first position along said path of movement of said sheets wherein the pressure contact at said second position accelerates transfer of said sheets along said path of movement; and
  driving means for rotating said paper feeding roller and said transferring roller independently of each other; and
said image information reading section including image information reading means operatively connected along said path of movement of said sheets between said first and second positions, said image information reading means including a light source for irradiating light on said sheets and an image sensor for reading image information on said irradiated sheets.

9. The image information reading apparatus as defined in claim 8, wherein said thrusting plate is transparent and the image sensor is positioned to read information on said sheets through said transparent thrusting plate.

10. The image information reading apparatus as defined in claim 8, wherein said transferring roller means comprises a first roller section and a second roller section, said first and second roller sections being arranged axially on both the sides of the paper feeding roller.

11. The image information reading apparatus as defined in claim 8, wherein the paper feeding roller and said transferring roller means include first gear means and wherein said driving means includes second gear means for engaging said first gear means, the ratio of number of teeth of said first gear means and said second gear means being such that said transferring roller means has a peripheral speed higher than that of said paper feeding roller.

12. The image information reading apparatus as defined in claim 8, further including a first belt and a second belt, said first belt extending between said driving means and said paper feeding roller and said second belt extending between said driving means and said transferring roller means.

13. The image information reading apparatus as defined in claim 8, wherein said paper feeding roller and said transferring roller means include first pulley means, and wherein said driving means includes second pulley means and belts, said belts extending around said first pulley means and said second pulley means, said first pulley means having a paper feeding roller pulley and a transferring roller pullley, the ratio of the diameters of said pulleys relative to said second pulley means being such that said transferring roller has a peripheral speed higher than the speed of said paper feeding roller, said paper feeding roller normally contacting the forward end of the lowermost paper proximate said leading edge.

14. The image information reading apparatus as defined in claim 8, wherein said driving means also includes a power supply and an electromagnetic clutch, wherein said paper feeding roller is connected to said power supply through said electromagnetic clutch.

15. The image information reading apparatus as defined in claim 8, wherein said driving means also includes a power supply and a one-way clutch, wherein said paper feeding roller is connected to said power supply of through said one-way clutch.

* * * * *